(12) United States Patent
Akutsu et al.

(10) Patent No.: US 9,446,697 B2
(45) Date of Patent: Sep. 20, 2016

(54) VEHICLE SEAT

(71) Applicants: TS TECH CO., LTD., Asaka-shi, Saitama (JP); HONDA MOTOR CO., LTD., Minato-ku, Tokyo (JP)

(72) Inventors: Takeshi Akutsu, Tochigi (JP); Hisato Oku, Wako (JP); Makoto Ohta, Wako (JP); Ryosuke Nakashima, Wako (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/419,368

(22) PCT Filed: Jun. 21, 2013

(86) PCT No.: PCT/JP2013/067106
§ 371 (c)(1),
(2) Date: Feb. 3, 2015

(87) PCT Pub. No.: WO2014/024586
PCT Pub. Date: Feb. 13, 2014

(65) Prior Publication Data
US 2015/0203013 A1    Jul. 23, 2015

(30) Foreign Application Priority Data
Aug. 7, 2012    (JP) .................. 2012-175351

(51) Int. Cl.
| A47C 7/02 | (2006.01) |
| B60N 2/68 | (2006.01) |
| B60N 2/58 | (2006.01) |
| B60N 2/60 | (2006.01) |
| B60N 2/66 | (2006.01) |
| B60N 2/70 | (2006.01) |
| B60N 2/44 | (2006.01) |
| B60N 2/64 | (2006.01) |
| B60N 2/22 | (2006.01) |
| B60N 2/42 | (2006.01) |
| B60N 2/427 | (2006.01) |

(52) U.S. Cl.
CPC ............. *B60N 2/682* (2013.01); *B60N 2/4228* (2013.01); *B60N 2/449* (2013.01); *B60N 2/5825* (2013.01);
(Continued)

(58) Field of Classification Search
CPC ........ B60N 2/682; B60N 2/68; B60N 2/686; B60N 2/688; B60N 2/42745; B60N 2/2222; B60N 2/4221; B60N 2/427
USPC ................ 297/452.1, 452.18, 452.19, 452.2, 297/452.24, 216.13
See application file for complete search history.

(56) References Cited

U.S. PATENT DOCUMENTS 5,722,731 A * 3/1998 Chang .................. B60N 2/0705
297/344.1
5,909,926 A * 6/1999 Gonzalez ............... B60N 2/143
297/301.4
(Continued)

FOREIGN PATENT DOCUMENTS

| CN | 101505996 A | 8/2009 |
| JP | 2002-142913 A | 5/2002 |
| JP | 2010-173434 A | 8/2010 |
| JP | 2012-025240 A | 2/2012 |
| WO | 2012/086804 A1 | 6/2012 |

OTHER PUBLICATIONS

Official Communications dated Apr. 5, 2016 for corresponding Chinese Application No. 201380041984.1.

Primary Examiner — Chi Q Nguyen
(74) Attorney, Agent, or Firm — Carrier Blackman & Associates, P.C.; William D. Blackman; Joseph P. Carrier

(57) ABSTRACT

A vehicle seat is provided in which a projecting part is integrally provided in a middle part of a lower frame of a seat back frame forming a framework of a seat back and is extending further forward and upward than the lower frame. This enables the impact absorption when the seat back receives an impact load from the rear to be enhanced, while stabilizing the supporting force applied to the occupant by the seat back for supporting the occupant's back.

15 Claims, 12 Drawing Sheets

(52) U.S. Cl.
CPC ............... *B60N 2/6009* (2013.01); *B60N 2/64* (2013.01); *B60N 2/66* (2013.01); *B60N 2/68* (2013.01); *B60N 2/7094* (2013.01); *B60N 2/2222* (2013.01); *B60N 2/427* (2013.01); *B60N 2/4221* (2013.01); *B60N 2/42745* (2013.01); *B60N 2/686* (2013.01); *B60N 2/688* (2013.01)

(56) References Cited

U.S. PATENT DOCUMENTS

| | | | | |
|---|---|---|---|---|
| 8,113,578 B2* | 2/2012 | Furuta | ................. | B60N 2/4885 297/216.12 |
| 8,459,747 B2* | 6/2013 | Watanabe | ................ | B60N 2/22 297/452.18 |
| 8,506,011 B2* | 8/2013 | Niitsuma | ............. | B60N 2/4885 297/216.12 |
| 8,528,982 B2* | 9/2013 | Fujita | ....................... | A47C 7/02 297/452.18 |
| 8,888,176 B2* | 11/2014 | Kaku | ................... | B60N 2/4235 297/216.13 |
| 8,888,177 B2* | 11/2014 | Kaku | ................... | B60N 2/4235 297/216.13 |
| 8,960,790 B2* | 2/2015 | Fujita | .................. | B60N 2/4221 297/216.13 |
| 8,967,663 B2* | 3/2015 | Seki | ..................... | B60N 2/4228 280/730.2 |
| 2012/0112512 A1* | 5/2012 | Sakai | ................... | B60N 2/7017 297/452.18 |
| 2012/0306251 A1* | 12/2012 | Arefi | ....................... | B60N 2/68 297/354.1 |
| 2013/0119723 A1 | 5/2013 | Nitsuma | | |
| 2013/0264849 A1 | 10/2013 | Adachi et al. | | |

* cited by examiner

STATE IN WHICH LOAD IS ACTING ON
PRESSURE-RECEIVING MEMBER 40

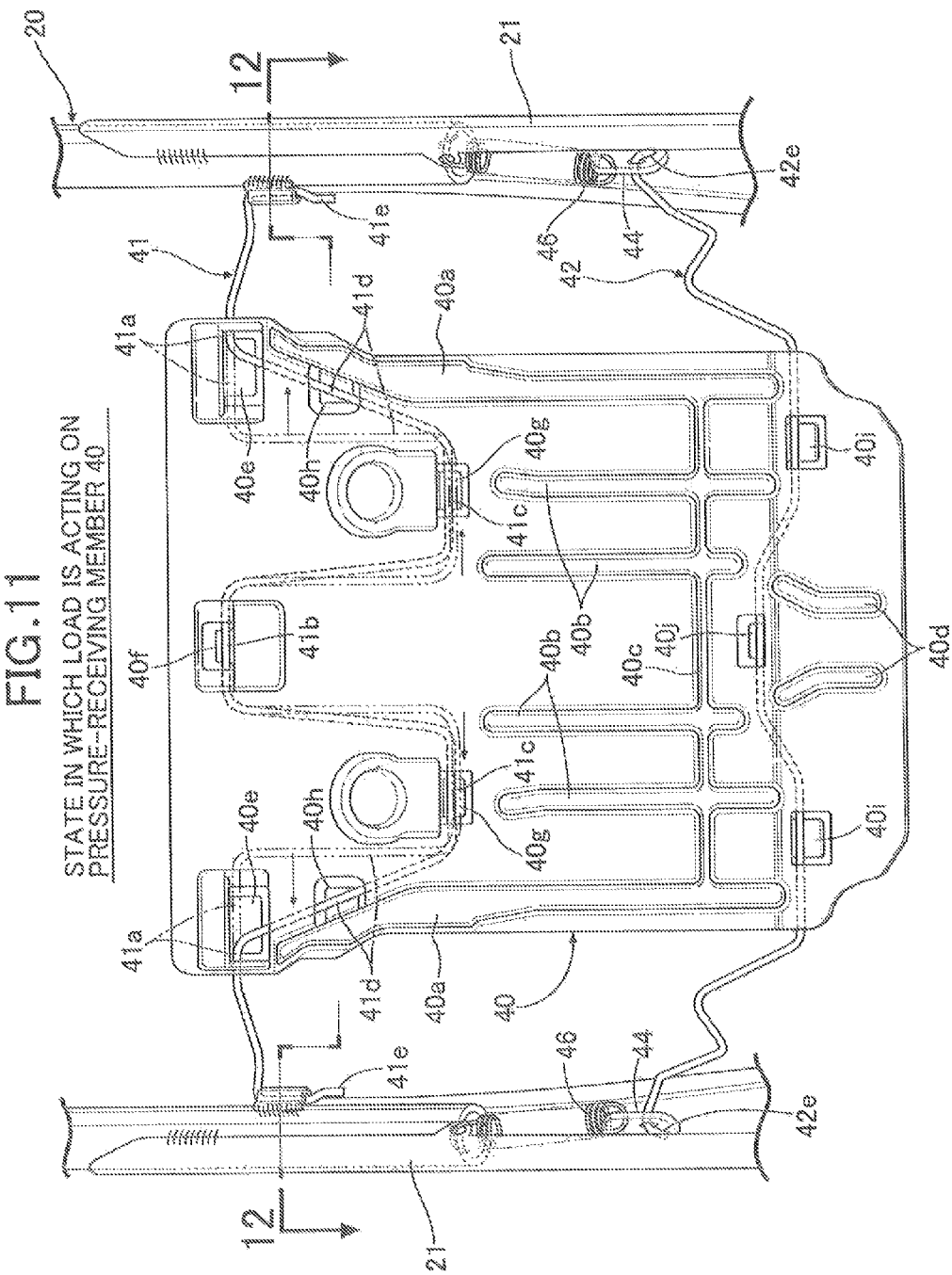

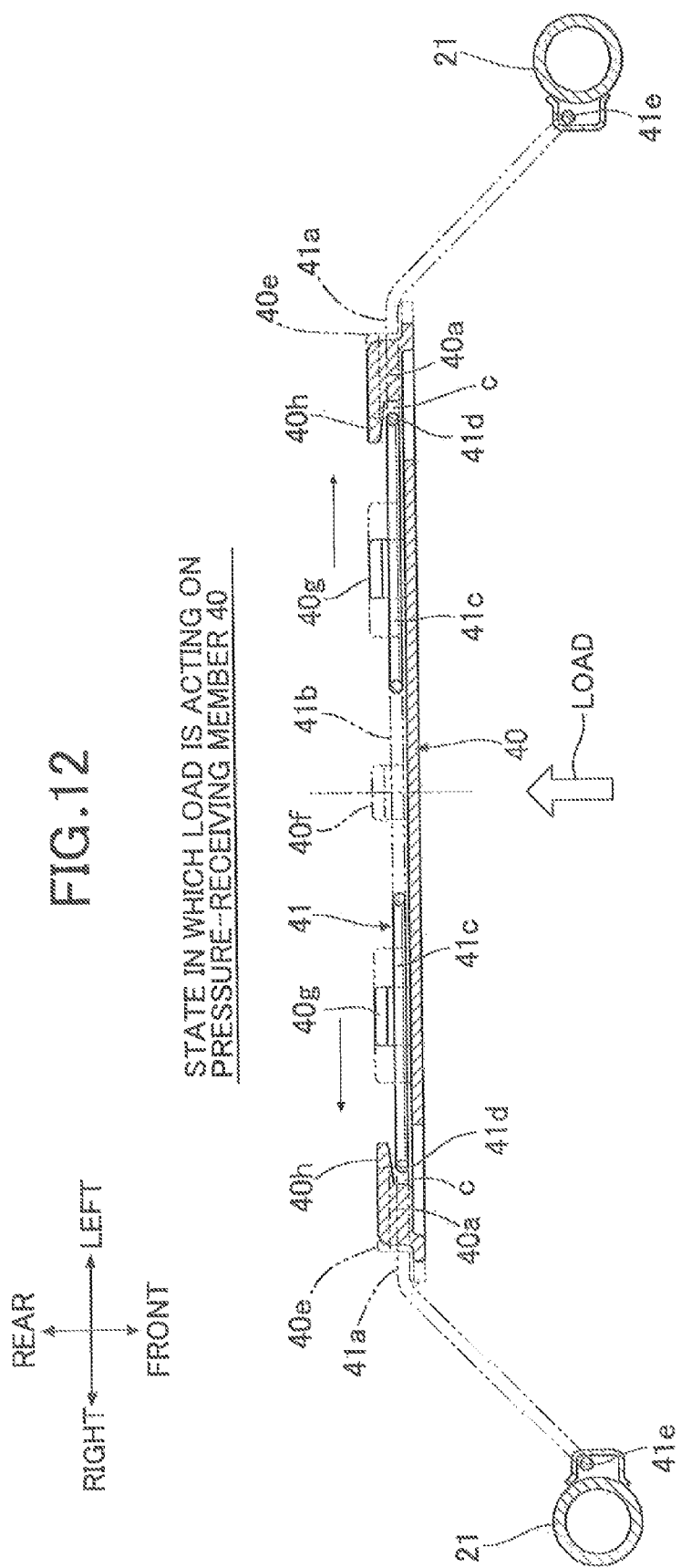

VEHICLE SEAT

TECHNICAL FIELD

The present invention relates to a vehicle seat that is installed in a vehicle, mainly an automobile, and that includes a seat cushion and a seat back linked to a rear end part of the seat cushion.

BACKGROUND ART

In such a vehicle seat, an arrangement is known in which a seat back frame forming the framework of the seat back is formed from left and right side frames disposed with a gap therebetween in the left-and-right direction, an upper frame joining upper parts of the left and right side frames, a lower frame joining lower parts of the left and right side frames, etc. (ref. Patent Document 1 below).

RELATED ART DOCUMENTS

Patent Documents

Patent Document 1: Japanese Patent Application Laid-open No. 2010-173434

SUMMARY OF THE INVENTION

Problems to be Solved by the Invention

However, since the seat back has a space formed above the lower frame of the seat back frame, there has been a desire to improve the bearing capacity of the seat back for an occupant by, in particular support for the lumbar region, when an excessive impact load acts on the seat back, for example, at a time of a rapid acceleration of the vehicle, at a time of a rear-end collision, etc.

The present invention has been accomplished in light of such circumstances, and it is an object thereof to provide a novel vehicle seat that satisfies the above desire by improving a seat back frame.

Means for Solving the Problems

In order to attain the above object, according to a first aspect of the present invention, there is provided a vehicle seat installed at an appropriate position of a vehicle and comprising a seat cushion for an occupant to be seated on and a seat back linked to a rear end part of the seat cushion and receiving a back of the occupant, characterized in that a seat back frame forming a framework of the seat back comprises left and right side frames disposed with a gap therebetween in a left-and-right direction, an upper frame joining upper parts of left and right side frames, and a lower frame joining lower parts of left and right side frames, and a projecting part extending further forward than the lower frame is provided in a middle part of the lower frame.

In order to attain the above object, according to a second aspect of the present invention, in addition to the first aspect, the projecting part projects further upward than left and right side parts of the lower frame.

In order to attain the above object, according to a third aspect of the present invention, in addition to the first or second aspect, the projecting part has in an upper part thereof an upper end bent portion.

In order to attain the above object, according to a fourth aspect of the present invention, in addition to the first, second or third aspect, the projecting part is formed from a member that is separate from the lower frame.

In order to attain the above object, according to a fifth aspect of the present invention, in addition to the first, second, third or fourth aspect, the upper end bent portion of the projecting part is bent forward, and an edge of a surface skin of the seat back is latched thereon.

In order to attain the above object, according to a sixth aspect of the present invention, in addition to the first, second, third, fourth or fifth aspect, the projecting part has a load-receiving face that is inclined further forward than the middle part of the lower frame.

In order to attain the above object, according to a seventh aspect of the present invention, in addition to the first, second, third, fourth, fifth or sixth aspect, a section between an upper part and a lower part of the projecting part is formed as a forwardly protruding curved face.

In order to attain the above object, according to an eighth aspect of the present invention, in addition to the first, second, third, fourth, fifth, sixth or seventh aspect, for the seat back provided with a pressure-receiving member supporting the back of the occupant, in a state in which no load is acting on the seat back from the rear, an upper end of the projecting part is positioned further to the rear than a lower end of the pressure-receiving member.

In order to attain the above object, according to a ninth aspect of the present invention, in addition to the seventh aspect, in a state in which the occupant is seated, when a load from the rear acts on the seat back, a lower end face of the pressure-receiving member and an upper end face of the projecting part are arranged in parallel to each other, and approach each other.

In order to attain the above object, according to a tenth aspect of the present invention, in addition to the eighth or ninth aspect, a width in a seat width direction of an upper end part of the projecting part is formed so as to be larger than a width in the seat width direction of a lower end part of the pressure-receiving member.

In order to attain the above object, according to an eleventh aspect of the present invention, in addition to the eighth, ninth or tenth aspect, a length in the seat width direction of the projecting part is larger than a length between left and right mounting parts of a lower mounting member via which a lower part of the pressure-receiving member is mounted on the seat back frame.

Effects of the Invention

In accordance with the first aspect of the present invention, since the lower frame is provided in its middle part with the projecting part, which extends further forward than the lower frame, the projecting part can be made closer to an occupant seated on the seat cushion, thus improving the capacity for bearing the occupant.

In accordance with the second aspect of the present invention, since the projecting part of the lower frame projects further upward than the left and right side parts of the lower frame, the capacity for bearing an occupant is further improved, and when the seat back receives an excessive load, it is possible to absorb effectively the impact load by means of the projecting part.

In accordance with the third aspect of the present invention, since the upper part of the projecting part has the upper end bent portion, it is possible to enhance the strength of the projecting part.

In accordance with the fourth aspect of the present invention, since the projecting part is formed from a member that is separate from the lower frame, it is possible to form the projecting part from a material that is most suitable for supporting the lumbar region of the occupant without impairing the original function of the lower frame.

In accordance with the fifth aspect of the present invention, since the upper end bent portion of the projecting part is bent forwardly, and the edge of the surface skin of the cushion member latches thereon, it is possible to stably support the edge of the surface skin by means of the projecting part.

In accordance with the sixth aspect of the present invention, since the projecting part has the load-receiving face inclined further forward than the middle part of the lower frame, the bearing capacity of the projecting part for an occupant can be improved.

In accordance with the seventh aspect of the present invention, since the projecting part has a section between the upper part and the lower part formed as a forwardly protruding curved face, the occupant does not experience a disagreeable sensation, and the bearing capacity is further improved.

In accordance with the eighth aspect of the present invention, since for the seat back provided with the pressure-receiving member supporting the back of the occupant, in a state in which no load is acting on the seat back from the rear, the upper end of the projecting part is positioned further to the rear than the lower end of the pressure-receiving member, the occupant does not experience a disagreeable sensation.

In accordance with the ninth aspect of the present invention, since in a state in which the occupant is seated, when a load from the rear acts on the seat back, a lower end face of the pressure-receiving member and an upper end face of the projecting part are arranged in parallel to each other, and these faces approach each other, the bearing capacity for the occupant can be further improved.

In accordance with the tenth aspect of the present invention, since the width in the seat width direction of the upper end part of the projecting part is formed so as to be larger than the width in the seat width direction of the lower end part of the pressure-receiving member, the bearing capacity of the projecting part for an occupant can be further stabilized.

In accordance with the eleventh aspect of the present invention, since the length in the vehicle width direction of the projecting part is larger than the length between the left and right mounting parts of the lower mounting member via which the lower part of the pressure-receiving member is mounted on the seat back frame, the bearing capacity of the projecting part for an occupant can be further stabilized.

BRIEF DESCRIPTION OF DRAWINGS

FIG. 11 is an enlarged view of a part of FIG. 4 showing the relationship between the pressure-receiving member and an upper linking wire in a state in which a load is acting on the pressure-receiving member (first embodiment).

FIG. 12 is a sectional view along line 12-12 in FIG. 11 (first embodiment).

EXPLANATION OF REFERENCE NUMERALS AND SYMBOLS

Figure 1:
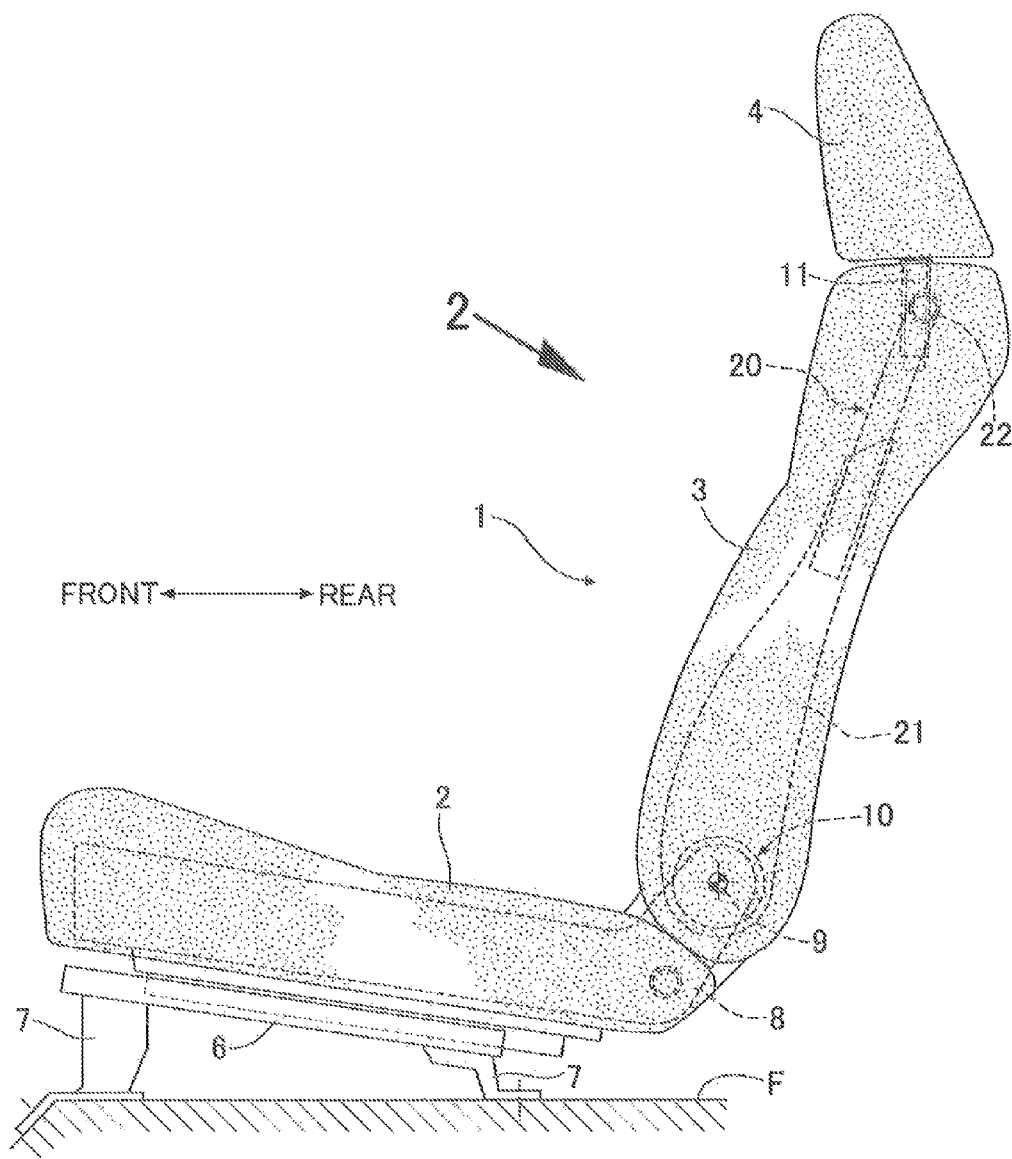
FIG. 1 is a side view of a seat (first embodiment).

2 Seat cushion
3 Seat back
15 Surface skin
20 Seat back frame
21 Side frame
22 Upper frame
23 Lower frame
26 Projecting part
26a Load-receiving face
26b Upper end bent portion
40i Lower mounting member (lower support piece)
M Occupant

DETAILED DESCRIPTION OF ILLUSTRATIVE EMBODIMENTS

The vehicle seat of the present invention is explained by reference to an embodiment in which it is put into practice for an automobile.

First Embodiment

In the explanation below, the front and rear of an automobile in which the seat is installed are defined as 'fore-and-aft', the left and right thereof are defined as 'left-and-right', and up and down are defined as 'vertical'.

Figure 2:
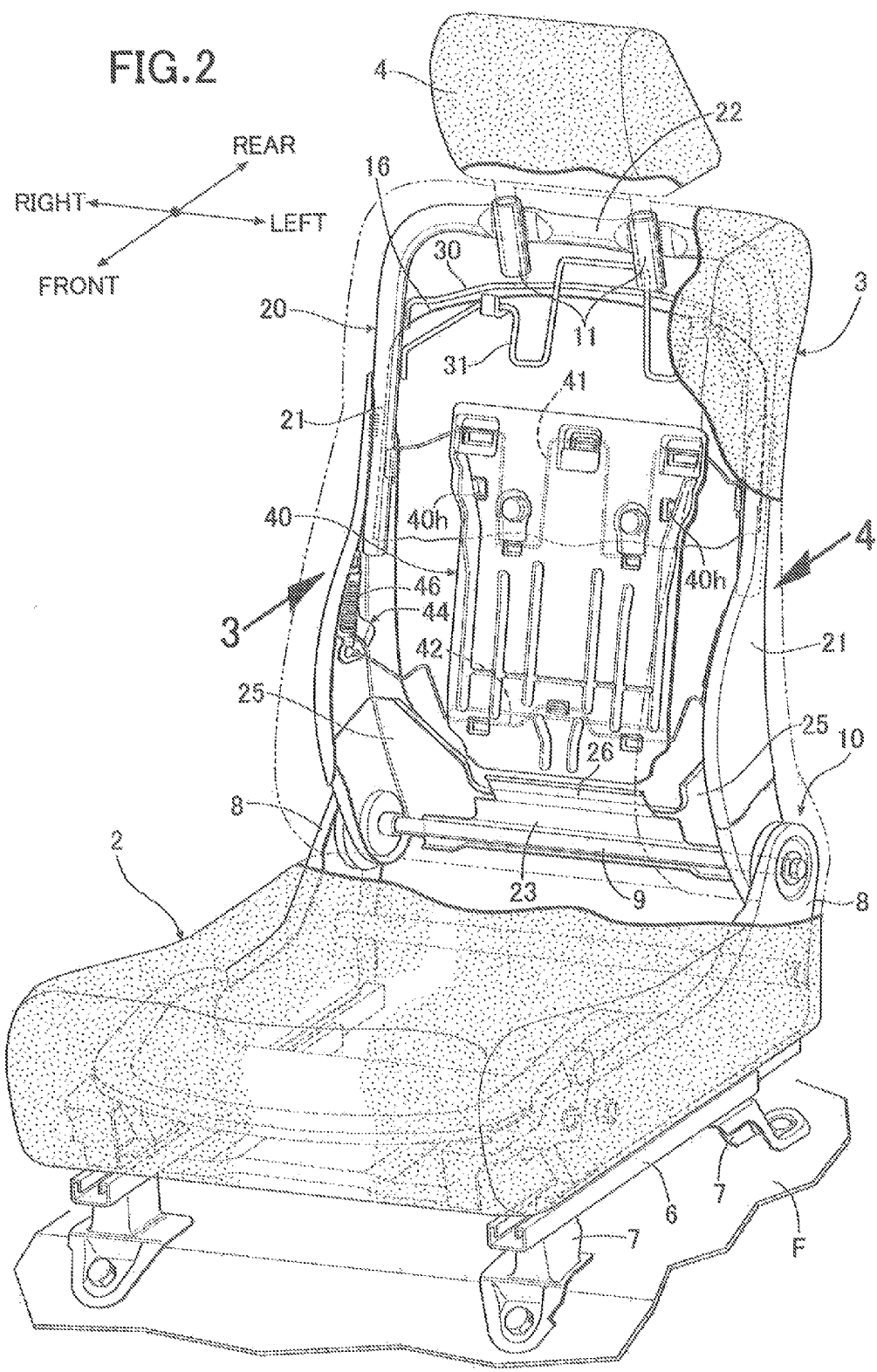
FIG. 2 is a partially cutaway front perspective view of the seat from arrow 2 in FIG. 1 (first embodiment).

As shown in FIGS. 1 and 2, a seat 1 for an automobile includes a seat cushion 2, a seat back 3, and a headrest 4.

The seat cushion 2 includes a seat cushion frame 6 having a plurality of support legs 7 and 7 provided in a lower part, and the support legs 7 and 7 are fixed to a floor F of the automobile.

A pair of left and right brackets 8, which project upwardly, are provided so as to be connected to a rear end part of the seat cushion frame 6, and a seat back frame 20 forming the framework of the seat back 3 is linked to the brackets 8 via a reclining mechanism 10, which is conventionally known, so that it can recline around a pivot shaft 9.

Furthermore, a pair of left and right headrest support tubes 11 and 11 are fixedly provided on an upper end part of the seat back frame 20, that is, an upper frame 22, and the headrest 4 is supported by these support tubes 11 and 11 so that it can be raised, lowered, and fixed by means of a conventionally known support device (not illustrated).

The specific structure of the seat back 3 of the seat 1 related to the present invention is now explained in detail by reference to FIGS. 1 to 9.

The seat back 3 includes the seat back frame 20 forming its framework, a foamed urethane cushion member 14 encapsulating the entire region of the seat back frame 20 and having its surface covered by a surface skin 15, and a back board 16 mounted on a back face of the seat back frame 20.

Figure 3:
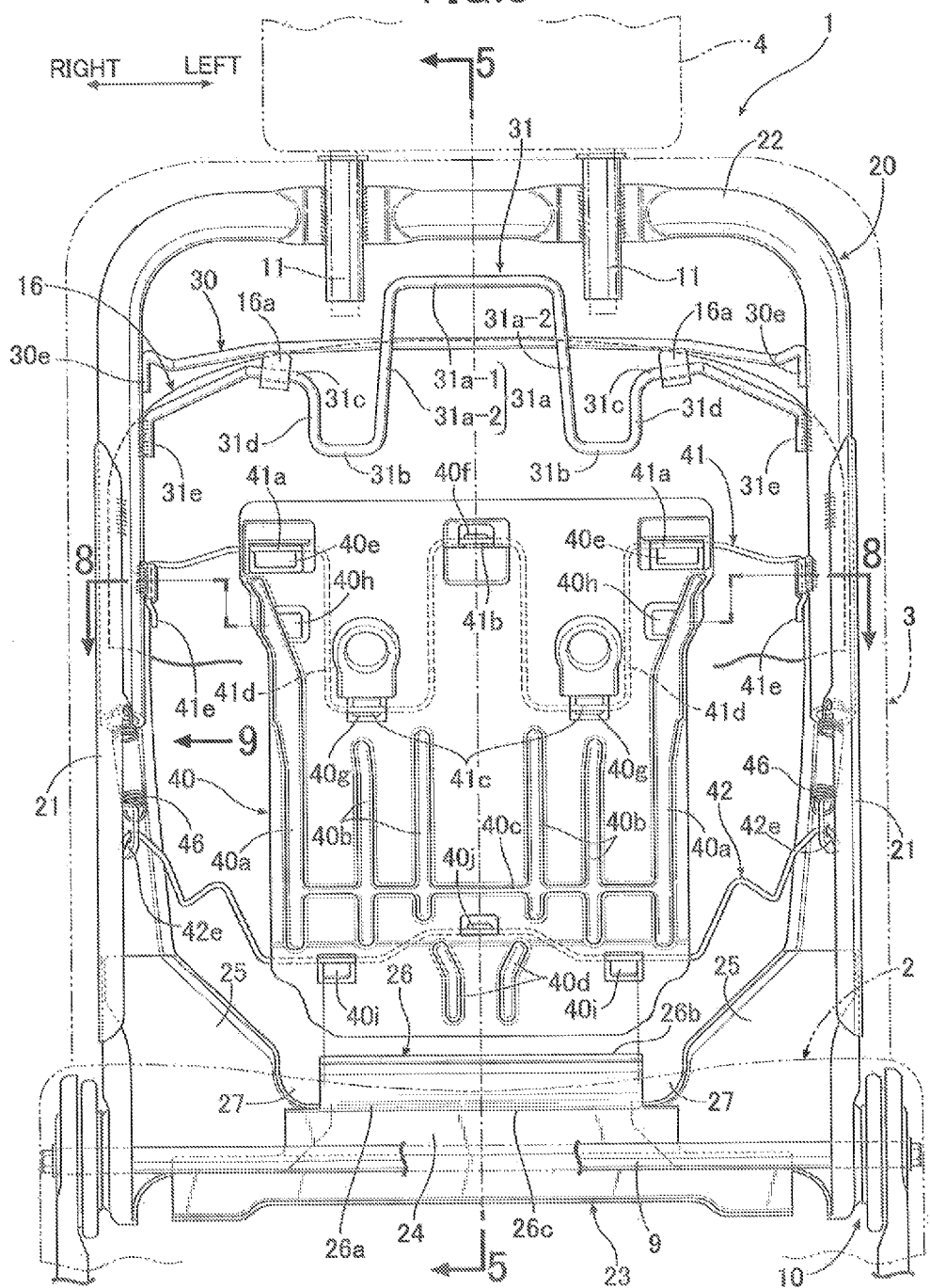
FIG. 3 is a front view of the seat from arrow 3 in FIG. 2 (first embodiment).
Figure 4:
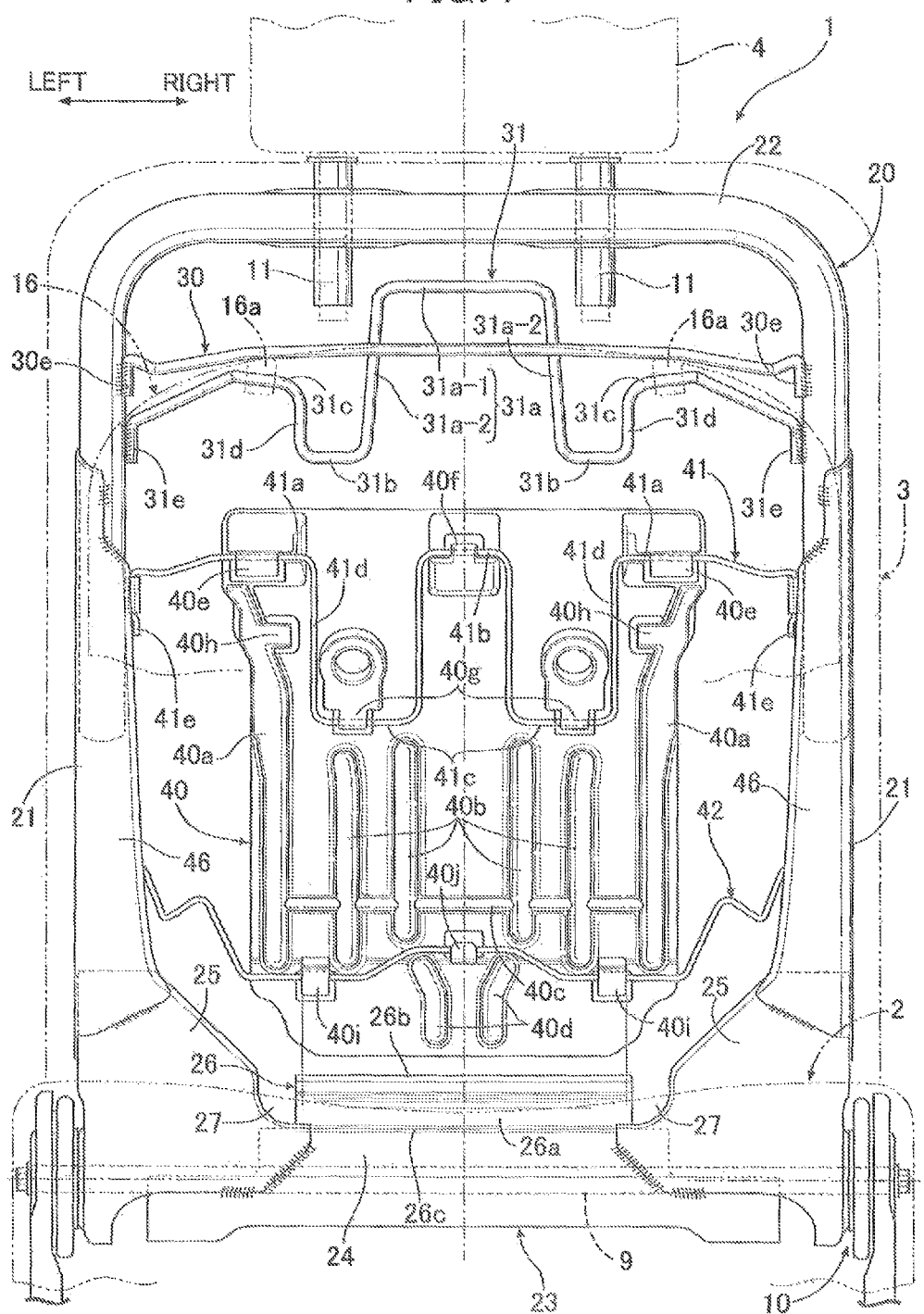
FIG. 4 is a rear view of the seat from arrow 4 in FIG. 2 (first embodiment).

As shown in FIGS. 2 to 4, the seat back frame 20 is formed into a rectangular shape that is long in the vertical direction; it is formed into a rectangular shape that is long in the vertical direction from left and right side frames 21 extending in the vertical direction in parallel to each other with a gap therebetween in the left-and-right direction, that is, the vehicle width direction, an upper frame 22 welded between the upper ends of the left and right side frames 21 and 21, and a lower frame 23 welded between the lower ends of the left and right side frames 21 and 21.

The left and right side frames 21 and 21 are formed so as to have a squared U-shaped cross section having mutually opposing inner faces open, their lower halves are formed into a curved shape so as to protrude forwardly, and the upper frame 22 is formed into a gantry shape from a pipe member.

The structure of the lower frame 23 is now explained.

This lower frame 23 includes a middle member 24 extending in the vehicle width direction between the left and right side frames 21 and 21, and left and right connecting members 25 and 25 that are integrally welded so as to connect the left and right ends of the middle member 24 and the lower ends left and right side frames 21 and 21. The middle member 24 is formed into a rectangular shape that is long in the vehicle width direction having a squared U-shaped cross section from a plate material such as a steel plate, whereas the left and right connecting members 25 and 25 are formed into a triangular shape having a squared U-shaped cross section from a plate material such as a steel plate. Inner end parts of the left and right connecting members 25 and 25 are connected to opposite left and right end parts of the middle member 24 so as to be superimposed thereon, and they are integrally welded. Upper ends of the left and right connecting members 25 and 25 are integrally welded to lower ends of the left and right side frames 21 and 21. The lower frame 23 is formed into an overall concave shape when viewed in the fore-and-aft direction.

The middle member 24 and the left and right connecting members 25 and 25 may be formed from the same material or different materials, and they may be formed to have the same thickness or different thicknesses.

As shown in FIGS. 3, 4, 5, and 7, an upper edge part of a middle part, in the vehicle width direction (left-and-right direction), of the middle member 24 has formed integrally therewith a rectangular projecting part 26 that is narrow and long in that direction so as to project upwardly. Recess parts 27 and 27 are formed between left and right ends of the projecting part 26 and opposite left and right end parts of the middle member 24 and the left and right connecting members 25 and 25, and the projecting part 26 can independently undergo elastic deformation in the fore-and-aft direction. This projecting part 26 is formed so as to have the same thickness as that of the lower frame 23 or a different thickness therefrom, for example, a thinner thickness.

Figure 10:
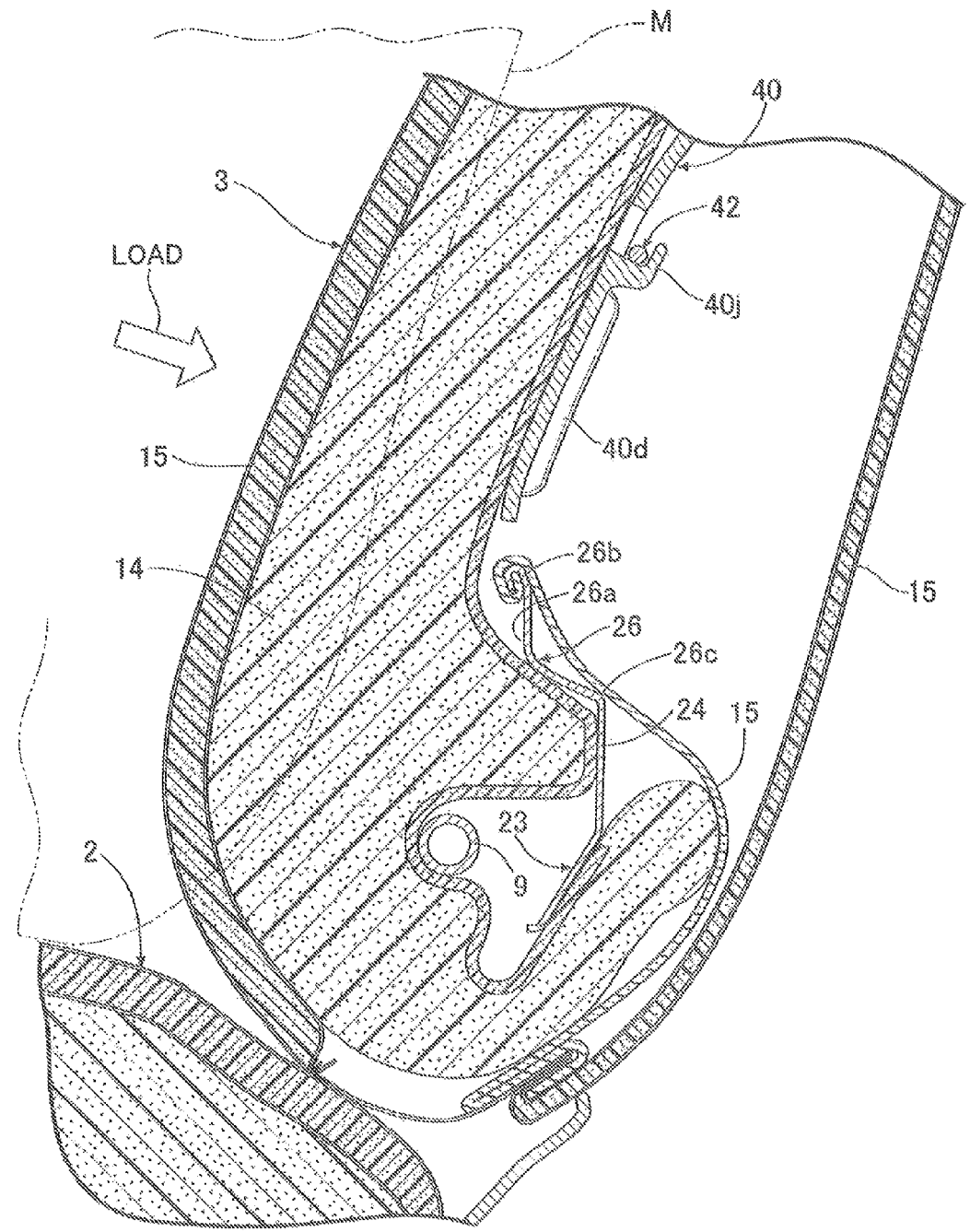
FIG. 10 is a sectional view, as in FIG. 7, showing a state in which a load is acting on a pressure-receiving member (first embodiment).

The structure of the projecting part 26 is now explained in further detail; this projecting part 26 is present to the rear of a pressure-receiving member 40, which is described later, in a state in which an occupant M is seated on the seat cushion 2, a distance d in the fore-and-aft direction is maintained between the upper end of the projecting part 26 and the lower end of the pressure-receiving member 40 (see FIGS. 5 and 7) to thus avoid a disagreeable sensation being given to the occupant M, and it is set so that, when a load from the occupant M acts on the seat back 3 such as when the automobile is rapidly accelerating or is involved in a rear-end collision, the upper end of the projecting part 26 and the lower end of the pressure-receiving member 40 become substantially flush with each other in the vertical direction, and the upper end face of the projecting part 26 is the closest to the lower end face of the pressure-receiving member 40 (see FIG. 10).

Figure 5:
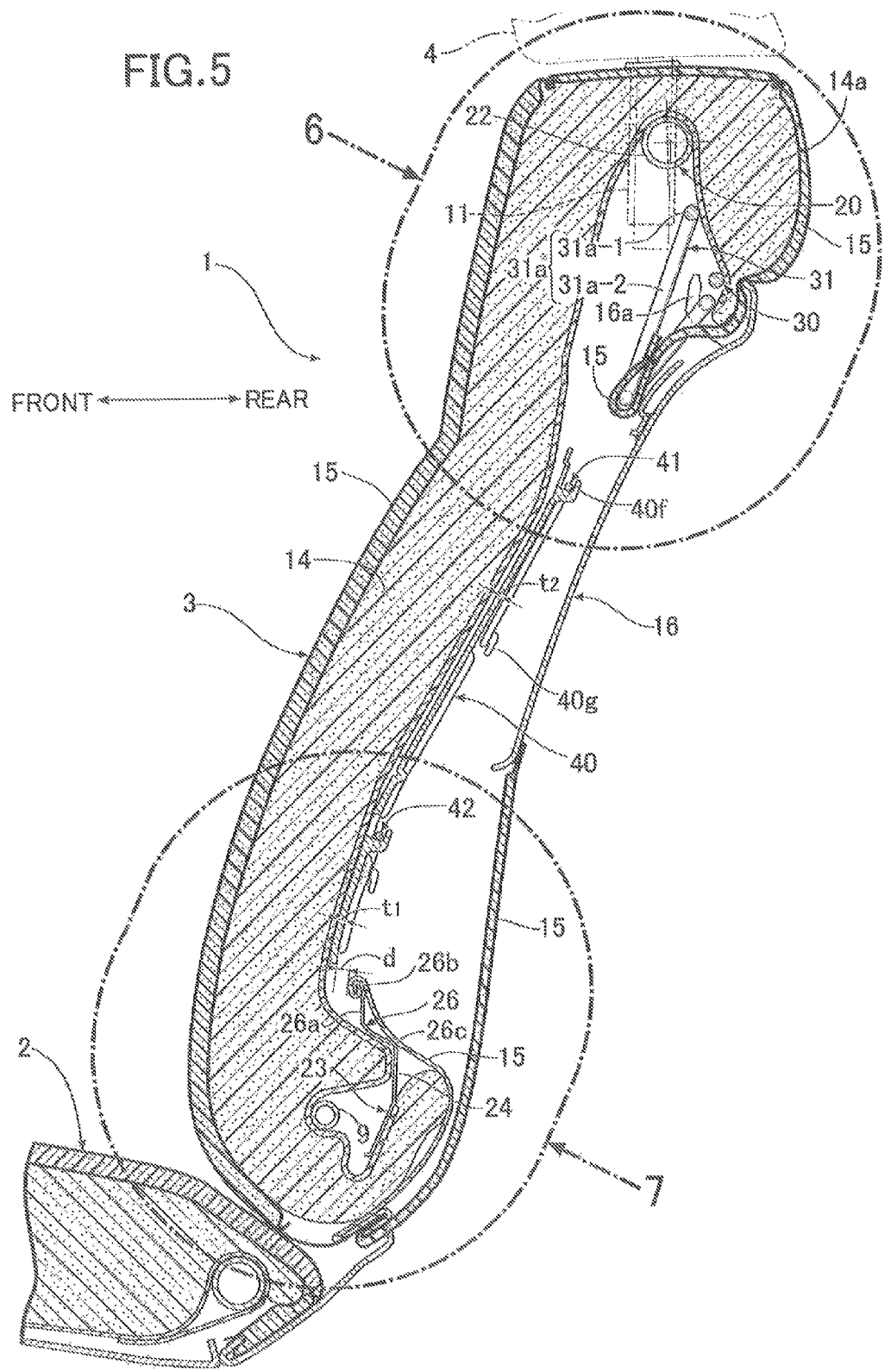
FIG. 5 is a sectional view along line 5-5 in FIG. 3 (first embodiment).
Figure 7:
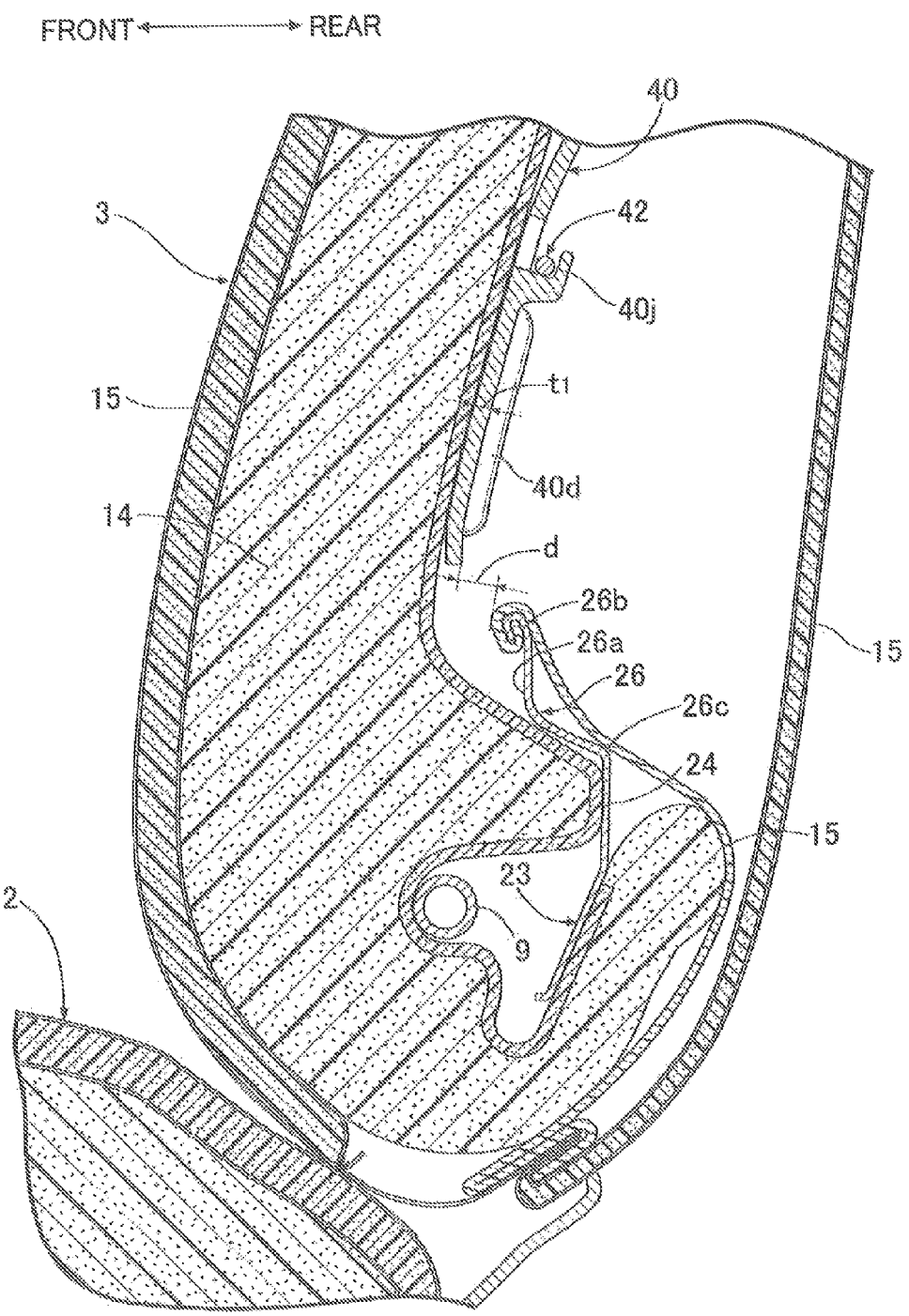
FIG. 7 is an enlarged view of a part circled by a phantom line shown by arrow 7 in FIG. 5 (first embodiment).

As shown in FIGS. 5 and 7, the projecting part 26 is inclined further to the front (occupant side) than the middle member 24, a load-receiving face that is formed from a forwardly protruding curved face and is in contact with a rear face of the cushion member 14 is formed on an intermediate region 26a in the vertical direction of the projecting part 26, an upper end bent portion 26b is formed at the upper end (free end) of the projecting part 26 so as to bend to the front, and a lower end bent portion 26c is formed at the lower end so as to bend to the rear, thus enhancing the stiffness of the projecting part 26. The upper end bent portion 26b may be utilized as a latching part for the lower edge of the surface skin 15, and the lower end bent portion 26c is connected integrally to the middle member 24. An upper end face of the projecting part 26 is substantially parallel to the lower end face of the pressure-receiving member 40, which is described later, with a gap therebetween.

The upper end (free end) of the upper end bent portion 26b may be bent to the rear.

As shown in FIGS. 2 to 4, a first restricting member 30 and a second restricting member 31 bridge an upper part of the seat back frame 20, that is, left and right side parts of the upper frame 22, across a vertical gap.

Figure 6:
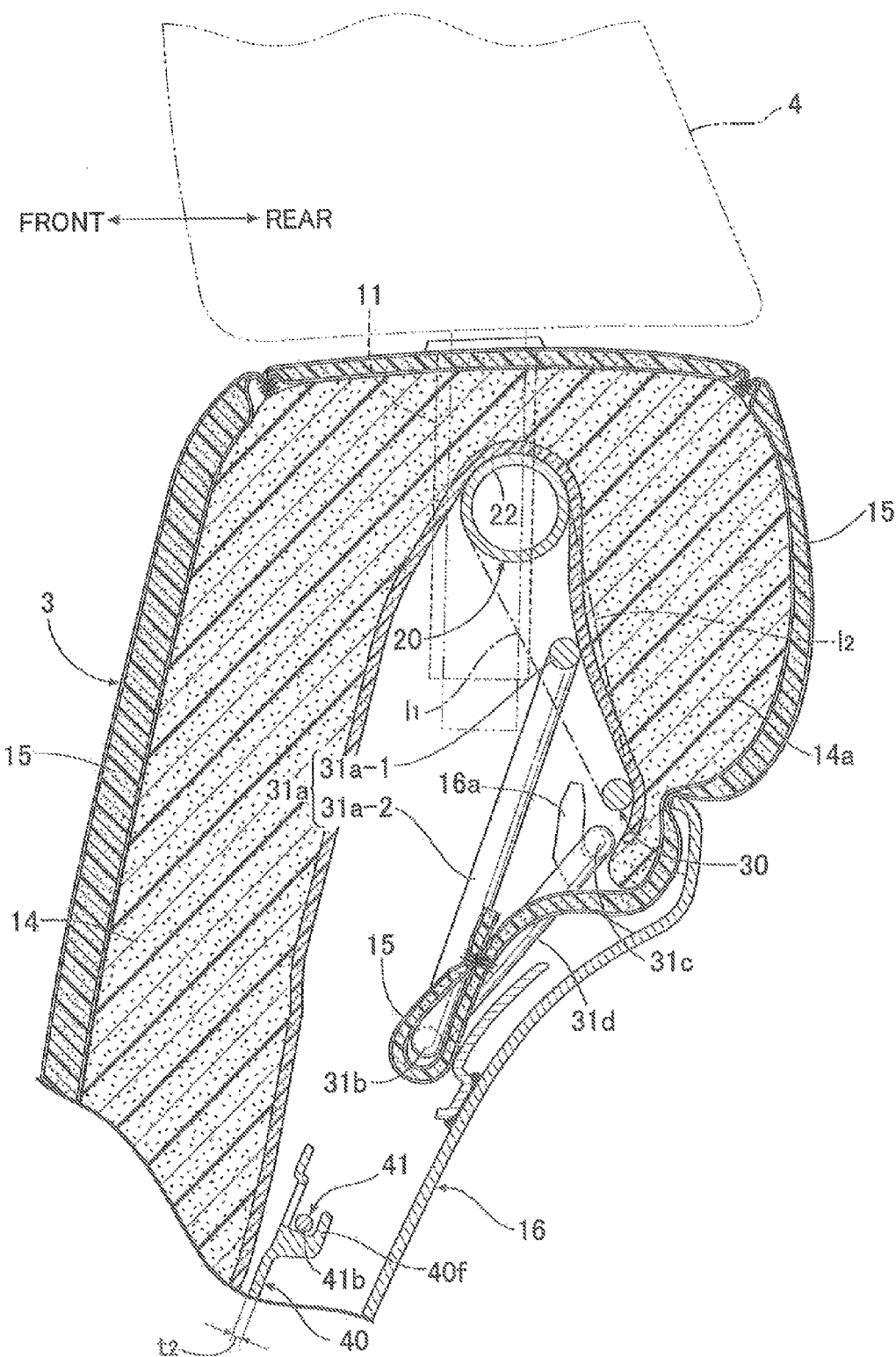
FIG. 6 is an enlarged view of a part circled by a phantom line shown by arrow 6 in FIG. 5 (first embodiment).

The first restricting member 30 is formed from a linear member such as a wire, and extends linearly in the vehicle width direction, and left and right ends 30e and 30e thereof are welded to the left and right side parts of the upper frame 22 of the seat back frame 20. This first restricting member 30, as shown in FIGS. 5 and 6, supports the upper edge of the back board 16 while holding a lower end part of a rear cushion member 14a that has gone round the upper frame 22 and hangs down to the rear, thus restricting deformation of the rear cushion member 44.

On the other hand, as shown in FIGS. 3 and 4, the second restricting member 31 is also formed from a linear member such as a wire, and left and right ends 31e and 31e thereof are welded to the left and right side parts of the upper frame 22. This second restricting member 31 is present further forward than the first restricting member 30 (see FIGS. 5 and 6) and is formed so as to be bent into a wavy shape in the vertical direction, and is integrally formed from a restricting portion 31a suppressing forward deformation of the rear cushion member 14a, a pair of surface skin mounting portions 31b and 31b for the surface skin 15 of the rear cushion member 44a to be mounted thereon, and a pair of back board mounting portions 31c and 31c for the upper edge of the back board 16 to latch onto. Specifically, the restricting portion 31a is formed in a middle part of the second restricting member 31 and is formed into an inverted U-shape intersecting the first restricting member 30 and projecting upwardly while having a projecting portion 31a-1 extending linearly in the lateral direction, and hanging portions 31a-2 hanging down from opposite ends of the linearly projecting portion 31a-1. Furthermore, the surface skin mounting portion 31b extends linearly in the lateral direction continuously from the lower end of the hanging portion 31a-2, and the back board mounting portion 31c extends linearly in the lateral direction via substantially vertical linking portions 31d and 31d on left and right sides of the surface skin mounting portion 31b.

As shown in FIGS. 3 and 4, the projecting portion 31a-1 of the restricting portion 31a of the second restricting member 31 projects further upward than the lower ends of the pair of headrest support tubes 11 and 11 provided on the upper frame 22, is disposed between the support tubes 11 and 11, and suppresses effectively deformation and intrusion of the rear cushion member 14a, in the vicinity of the pair of headrest support tubes 11 and 11, further toward the front than the projecting portion 31a-1, that is, the occupant side.

As shown in FIGS. 3, 4, 5, and 6, a pair of mounting hooks 16a and 16a provided on an inner side of the upper end of the back board 16 covering a back face of the seat back 16 are latched onto the back board mounting portions 31c and 31c of the second restricting member 31, and the upper end of the back board 16 is mounted on the second restricting member 31. Furthermore, the end of the surface skin 15 covering the cushion member 14 is secured to the surface skin mounting portions 31b and 31b of the second restricting member 31.

When an excessive external force acts on the seat back 3 such as at a time of rapid acceleration of the automobile or at a time of a rear-end collision, the restricting portion 31a provided on the second restricting member 31 can suppress deformation and intrusion of the cushion member 14a, which is on the rear side of the seat back frame 20, toward the front side thereof, thereby stabilizing the protection of an occupant by the cushion member 14.

Furthermore, when the seat back 3 is being manufactured, when it is being transported, etc., if an excessive external force acts on the seat back 3 from the rear, the restricting portion 31a of the second restricting member 31 can suppress deformation and intrusion of the rear cushion member 14a, which is on the rear side of the seat back frame 20, toward the front side thereof.

As shown in FIGS. 2 to 7 and 11, the pressure-receiving member 40 is disposed within the seat back frame 20 across a gap in all directions, the pressure-receiving member 40 supporting the upper half of the body of the occupant M seated on the seat cushion, that is, the thorax and the lumbar region thereof. This pressure-receiving member 40 is formed from a plate material made of a synthetic resin such as PP (polypropylene) into a rectangular shape when viewed from the fore-and-aft direction, and is elastically supported on the seat back frame 20 so as to flex in the fore-and-aft direction via an upper linking wire 41 as an upper linking member and a lower linking wire 42 as a lower linking member. The upper linking wire 41 has a larger amount of stretching in the axial direction than that of the lower linking wire 42, and the pressure-receiving member 40 is thereby made to have a larger amount of flexing in the fore-and-aft direction for its upper part than for its lower part.

As shown in FIGS. 3 and 4, the pressure-receiving member 40 is formed so that its upper part has a larger width in the vehicle width direction than that of its lower, and its upper part has a thickness $t_2$ that is smaller than a thickness $t_1$ of its lower part (see FIG. 5). Left and right side vertical ribs 40a and 40a are formed on the left and right sides of the pressure-receiving member 40 so as to protrude toward the back face side, and a plurality of vertical ribs 40b, a horizontal rib 40c crossing them, and a plurality of other small ribs 40d are formed over substantially the entire region of a lower half of the pressure-receiving member 40 so as to protrude toward the back face side, these ribs reinforcing the left and right side parts and the lower half of the pressure-receiving member 40. When a load from the occupant M acts on the pressure-receiving member 40, its upper part undergoes elastic deformation more easily than its lower part, and the amount of sinking of the upper part is made large, thus enhancing the efficiency with which the pressure-receiving member 40 protects the occupant M.

As shown in FIGS. 3 and 4, the upper part and the lower part of the pressure-receiving member 40 are elastically deformably supported by the upper and lower linking wires 41 and 42 so as to flex in the fore-and-aft direction.

Left and right upper support pieces 40e and 40e having a downwardly opening hook shape are formed integrally with upper corners of the back face of the pressure-receiving member 40, a hook-shaped upper central support piece 40f, which opens upwardly, is formed integrally with a middle part above the upper corners and, furthermore, hook-shaped left and right intermediate support pieces 40g and 40g, which open downwardly, are integrally formed further down than the support piece 40f between the left and right upper support pieces 40e and 40e and the upper central support piece 40f.

On the other hand, the upper linking wire 41 is formed so as to bend in a wavy shape in the vertical direction, and opposite ends 41e and 41e thereof link the left and right side frames 21 and 21 of the seat back frame 20. The left and right upper support pieces 40e and 40e respectively of the pressure-receiving member 40 are laterally slidably supported on left and right upper portions 41a and 41a extending in the lateral direction of the upper linking wire 41, the upper central support piece 40f is supported on an upper portion 41b extending in the lateral direction of the upper linking wire 41, and the left and right intermediate support pieces 40g and 40g respectively are laterally slidably supported on left and right lower portions 41c and 41c extending in the lateral direction of the upper linking wire 41.

Figure 8:
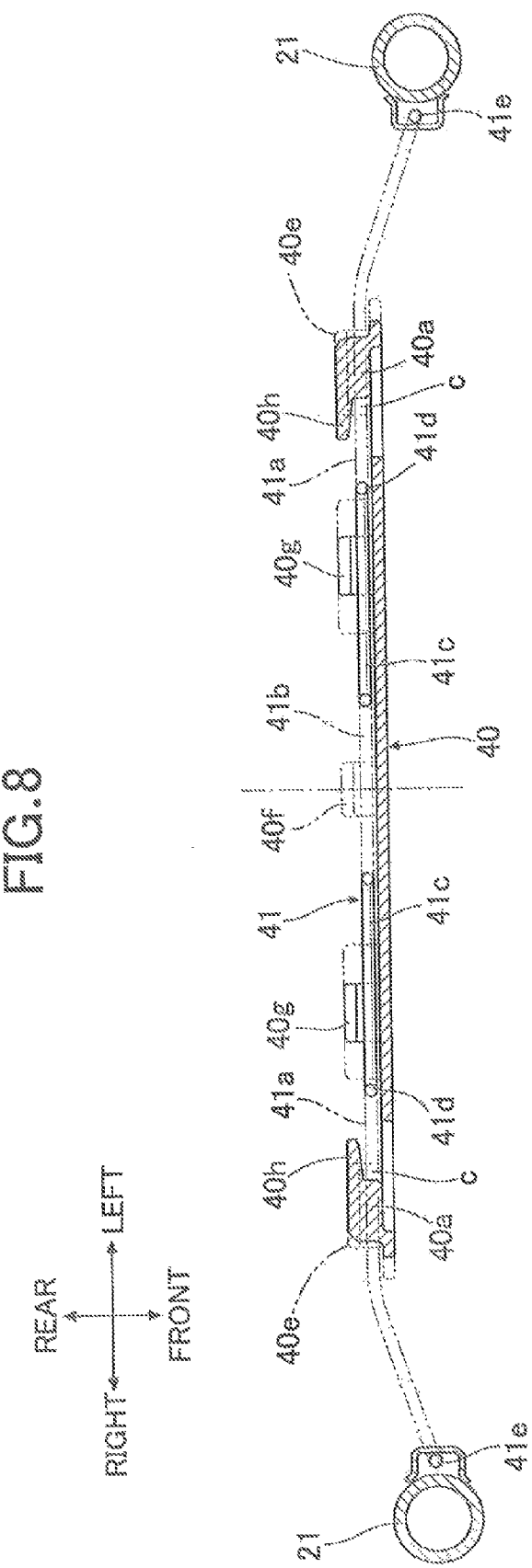
FIG. 8 is a sectional view along line 8-8 in FIG. 3 (first embodiment).

Furthermore, as shown in FIGS. 3, 4, and 8, a pair of left and right abutment members 40h and 40h are provided integrally with left and right upper parts of the pressure-receiving member 40, the left and right abutment members 40h and 40h abutting against the upper linking wire 41 so as to restrict the amount of flexing of the pressure-receiving member 40. That is, the abutment members 40h and 40h bent inwardly with a gap between themselves and the back face of the pressure-receiving member 40 are formed integrally with upper parts of the left and right side vertical ribs 40a and 40a of the pressure-receiving member 40. Receiving spaces c and c (see FIGS. 8 and 12) are formed between the abutment members 40h and 40h and the back face of the pressure-receiving member 40, the receiving spaces c and c receiving left and right side portions 41d and 41d of the upper linking wire 41. The left and right side portions 41d and 41d of the upper linking wire 41, which have entered the receiving spaces c and c, each abut against the abutment members 40h and 40h to thus suppress displacement of the pressure-receiving member 40 to the rear, thereby restricting the amount of flexing (amount of sinking) of the pressure-receiving member 40 to the rear.

The lower part of the pressure-receiving member 40 is supported by the lower linking wire 42 so as to be movable to the rear. As shown in FIGS. 3 and 4, hook-shaped left and right lower support pieces 40i and 40i, which open downwardly, are formed integrally with the lower left and right parts of the back face of the pressure-receiving member 40, and a hook-shaped lower central support piece 40j, which opens upwardly, is formed integrally with its middle part.

Figure 9:
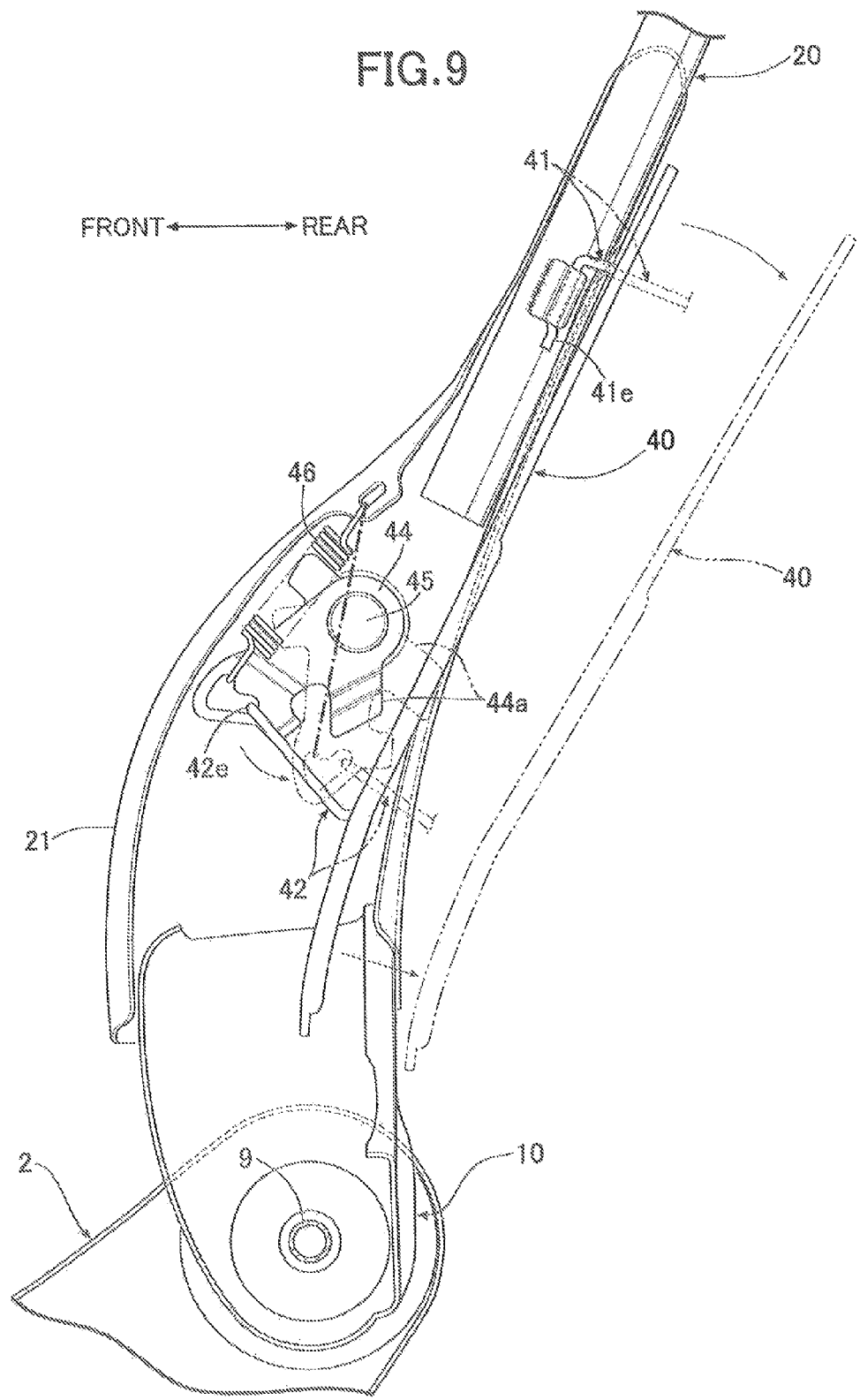
FIG. 9 is an enlarged view from arrow 9 in FIG. 3 (first embodiment).

On the other hand, the lower linking wire 42 is bent in the vertical direction, and opposite ends 42e and 42e thereof are each linked to the left and right side frames 21 and 21 of the seat back frame 20 via a pivoting member 44 and a tensile spring 46. As shown in FIG. 9, the pivoting member 44 is axially supported 45 on the side frame 21 so as to be pivotable in the fore-and-aft direction, the tensile spring 46 is stretched between the lower end of the pivoting member 44 and the side frame 21, and the tensile force of the tensile spring 46 urges the pivoting member 44 so as to pivot upward (FIG. 9, clockwise direction). The end portion 42e of the lower linking wire 42 is linked to the lower end of the pivoting member 44. Therefore, if a rearward load acts on the pressure-receiving member 40, the lower part of the pressure-receiving member 40 flexes rearwardly via the pivoting member 44 and the tensile spring 46. A stopper piece 44a is provided integrally with the pivoting member 44, this stopper piece 44a engaging with the edge of the side frame 21 so as to restrict the amount of rearward flexing of the lower part of the pressure-receiving member 40.

The pressure-receiving member 40 supported on the seat back frame 20 by the upper linking wire 41 and the lower linking wire 42 is set so that, when a rearward load acts thereon from the occupant M, the upper part mainly supporting the thorax of the occupant M has a larger amount of flexing, that is, amount of sinking, than the lower part, which mainly supports the lumbar region of the occupant.

The head of the occupant M seated on the seat cushion 2 is supported by the headrest, and the upper body half of the occupant M is supported by the pressure-receiving member 40 of the seat back 3 as well as by the projecting part 26 specially provided on the middle member 24 of the lower frame 23 of the seat back frame 20.

In particular, since the projecting part 26 projects upwardly from the middle member 24 of the lower frame 23 toward the pressure-receiving member 40 and extends further forward than the lower frame 23 so as to be closer to the occupant M, it is possible by means of the projecting part 26 to quickly and directly support the upper body half of the occupant M, in particular the lumbar region, and even if an excessive impact load acts on the seat back 3 at a time of rapid acceleration of the automobile at a time of a rear-end collision, etc., it is possible to absorb the impact load effectively, thus improving the capacity for bearing the occupant.

Furthermore, since the projecting part 26 has the bent portions 26b and 26c formed thereon, the strength of the projecting part 26 is enhanced, and the projecting part 26 will not be deformed or damaged by an impact load.

Moreover, if the projecting part 26 is formed from a member that is separate from the lower frame 23, the projecting part 26 can be formed from a material that is most suitable for supporting the occupant M without impairing the original function of the lower frame 23.

Furthermore, when the upper end bent portion 26b of the projecting part 26 is bent forward, the edge of the surface skin 15 of the cushion member 14 can latch thereon, and the edge of the surface skin 15 can be supported stably by the projecting part 26.

Moreover, since the projecting part 26 has the load-receiving face 26a, which is inclined further forward than the middle member 24 of the lower frame 23, it is possible by means of the projecting part 26 to support the occupant M quickly, thus improving the bearing capacity.

Furthermore, since the projecting part 26 has a section between the upper part and the lower part thereof formed into a forwardly protruding curved face, the occupant M does not experience a disagreeable sensation, and the bearing capacity is further improved.

Moreover, in a state in which an occupant is seated normally (a state in which an excessive load is not acting on the seat back 3), since the upper end of the projecting part 26 is positioned further to the rear than the lower end of the pressure-receiving member 40, the occupant M does not experience a disagreeable sensation.

Furthermore, in a state in which an occupant is seated, when an excessive load acts on the seat back, since the lower end face of the pressure-receiving member 40 and the upper end face of the projecting part 26 are arranged in parallel to each other and these faces approach each other, the capacity for bearing the occupant M can be further improved.

Moreover, since the length in the seat width direction of the upper end part of the projecting part 26 is larger than the length between the left and right mounting parts of the lower mounting member via which the lower end part of the pressure-receiving member 40 is mounted on the seat back frame, the bearing capacity of the projecting part 26 for an occupant can be further stabilized.

Furthermore, since the length in the seat width direction of the projecting part 26 is larger than the length between the left and right mounting parts via which the lower parts of the pressure-receiving member 40 is mounted on the seat back frame 20, the bearing capacity of the projecting part 26 for the occupant M can be further stabilized.

The present invention is not limited to the above embodiment, and may be modified in a variety of ways as long as the modifications do not depart from the spirit and scope thereof.

For example, in the embodiment, a case in which the vehicle seat of the present invention is applied to one for an automobile is explained, but this can of course be applied to another vehicle such as a train or a ship.

The invention claimed is:

1. A vehicle seat configured to be installed at an appropriate position of a vehicle and comprising a seat cushion for an occupant to be seated on and a seat back linked to a rear end part of the seat cushion and configured for receiving a back of the occupant,
wherein:
the seat back comprises a seat back frame forming a framework of the seat back and comprising spaced-apart left and right side frames, an upper frame joining upper parts of the left and right side frames, and a lower frame joining lower parts of the left and right side frames,
the lower frame comprises a middle member extending in a vehicle width direction between the left and right side frames, and left and right connecting members connecting opposite ends of the middle member to the left and right side frames,
the seat back is provided with a pressure-receiving member for supporting a back of the occupant, and
the middle member is provided in a middle part thereof with a projecting part projecting further upward than left and right side parts of the middle member so as to extend further forward than the middle member, the projecting part being positioned further to the rear than a lower end of the pressure-receiving member.

2. The vehicle seat according to claim 1, wherein a recess part is formed between left and right side parts of the projecting part and the left and right side parts of the middle member and the left and right connecting members.

3. The vehicle seat according to claim 1, wherein the projecting part has in an upper part thereof an upper end bent portion, has at the lower end a lower end bent portion that makes the projecting part be inclined forward, and further has a bent portion between the lower end bent portion and the upper end bent portion, the bent portion being bent in a convex shape toward the front.

4. The vehicle seat according to claim 3, wherein the upper end bent portion of the projecting part is bent forward, and an edge of a surface skin of the seat back is latched thereon.

5. The vehicle seat according to claim 1, wherein the projecting part is formed from a member that is separate from the lower frame.

6. The vehicle seat according to claim 1, wherein the projecting part has a load-receiving face that is inclined upwardly to the front so as to be further forward than the middle part of the middle member.

7. The vehicle seat according to claim 6, wherein in a state in which no load is acting on the seat back from the rear, an upper end and the load-receiving face of the projecting part are positioned further to the rear than a lower end of the pressure-receiving member.

8. The vehicle seat according to claim 7, wherein in a state in which the occupant is seated, when a load from the rear acts on the seat back, a lower end face of the pressure-receiving member and an upper end face of the projecting part are arranged in parallel to each other, and approach each other such that the front end of the projecting part is disposed directly beneath the lower end of the pressure-receiving member.

9. The vehicle seat according to claim 7, wherein a width in a seat width direction of an upper end part of the projecting part is formed so as to be larger than a width in the seat width direction of a lower end part of the pressure-receiving member.

10. The vehicle seat according to claim 7, wherein a length in the seat width direction of the projecting part is larger than a length between left and right mounting parts of a lower mounting member via which a lower part of the pressure-receiving member is mounted on the seat back frame.

11. The vehicle seat according to claim 1, wherein a section between an upper part and a lower part of the projecting part is formed as a forwardly protruding curved face.

12. A vehicle seat configured to be installed at an appropriate position of a vehicle and comprising a seat cushion for an occupant to be seated on and a seat back linked to a rear end part of the seat cushion and configured to receive a back of the occupant, wherein:
the seat back comprises a seat back frame forming a framework of the seat back and comprising spaced-apart left and right side frames, an upper frame joining upper parts of the left and right side frames, and a lower frame joining lower parts of the left and right side frames,
the lower frame comprises a middle member extending in a vehicle width direction between the left and right side frames, and left and right connecting members connecting opposite ends of the middle member to the left and right side frames,
the seat back is provided with a pressure-receiving member for supporting a back of the occupant,
the middle member is provided in a middle part thereof with a projecting part projecting further upward than left and right side parts of the middle member so as to extend further forward than the middle member, wherein the projecting part has a load-receiving face that is inclined upwardly to the front so as to be further forward than the middle part of the middle member, the projecting part positioned further to the rear than a lower end of the pressure-receiving member, and
a width in a seat width direction of an upper end part of the projecting part is formed so as to be larger than a width in the seat width direction of a lower end part of the pressure-receiving member.

13. The vehicle seat according to claim 12, wherein a length in the seat width direction of the projecting part is larger than a length between left and right mounting parts of a lower mounting member via which a lower part of the pressure-receiving member is mounted on the seat back frame.

14. The vehicle seat according to claim 12, wherein in a state in which no load is acting on the seat back from the rear, an upper end and the load-receiving face of the projecting part are positioned further to the rear than a lower end of the pressure-receiving member.

15. The vehicle seat according to claim 12, wherein in a state in which the occupant is seated, when a load from the rear acts on the seat back, a lower end face of the pressure-receiving member and an upper end face of the projecting part are arranged in parallel to each other, and approach each other such that the front end of the projecting part is disposed directly beneath the lower end of the pressure-receiving member.

* * * * *